United States Patent

Finney

[11] 4,040,690
[45] Aug. 9, 1977

[54] LAMINATED BEARING

[75] Inventor: Robert H. Finney, Erie, Pa.

[73] Assignee: Lord Corporation, Erie, Pa.

[21] Appl. No.: 632,423

[22] Filed: Nov. 17, 1975

[51] Int. Cl.$^2$ .............................................. F16C 9/00
[52] U.S. Cl. .................................. 308/237 R; 308/26;
260/141; 416/134 A
[58] Field of Search ............. 308/2, 26, 237 R, 237 A;
287/85; 260/141; 416/134

[56] References Cited

U.S. PATENT DOCUMENTS

| | | | |
|---|---|---|---|
| 3,083,065 | 3/1963 | Hinks et al. | 308/237 R |
| 3,679,197 | 7/1972 | Schmidt | 308/26 |

Primary Examiner—Robert R. Song
Assistant Examiner—Richard A. Bertsch
Attorney, Agent, or Firm—Maurice R. Salada; James W. Wright

[57] ABSTRACT

A laminated bearing comprises a plurality of alternating and bonded layers of elastomeric material and nonextensible material. The layers alternate along a common axis extending lengthwise of the bearing so that the bearing can support substantial compressive loads applied generally normal to the layers. Each layer is contoured to have, in section taken radially of the common axis, a portion projecting longitudinally toward one end of the bearing. Under large compressive loads, the contour of the layers may contribute to excessive strains in the elastomeric layers adjacent the end of the bearing toward which the layers project. To accommodate the compressive stresses without excessive strains, the layers of elastomeric material in a central lengthwise portion of the bearing have smaller compression moduli than the layers of elastomeric material adjacent the one end of the bearing.

16 Claims, 6 Drawing Figures

LAMINATED BEARING

BACKGROUND OF THE INVENTION

The compressive load carrying capacity of a layer of resilient material may be increased several hundred percent by incorporating a plurality of spaced, parallel laminae fabricated of nonextensible material and oriented generally perpendicular to the direction of the anticipated compressive load. The laminae increase the compressive load carrying capacity of the resilient material by reducing the ability of the material to deflect or bulge in directions transverse to the direction of the compressive load. At the same time, the ability of the material to yield in shear or torsion in directions parallel to the laminations or transverse to the direction of the compressive load is substantially unaffected. The characteristics of such a laminated resilient material have resulted in the commercial acceptance for a variety of applications of bearings incorporating the material. One area of particular importance is the mounting of helicopter rotor blades on an associated rotor hub.

In a typical mounting system for the blades of a helicopter rotor, as shown for example in Rybicki et al. U.S. Pat. No. 3,829,239, each rotor blade is secured to a rotor hub by two, serially arranged laminated bearings. One laminated bearing, which has annular, disc-shaped laminations, resists the centrifugal load on the rotor blade and permits oscillatory pitch-change movements of the blade about its longitudinal axis. The other bearing, which has annular, spherically-shaped laminations, also resists the centrifugal load on the rotor blade and accommodates pitch-change, flapping and lead-lag movements of the blade. Since the pitch-change rotations of the blade are of a relatively large magnitude (i.e. 10° to 15° in each rotational direction), particularly when compared to the lead-lag and flapping motions, the combined torsional movement capabilities of the two laminated bearings must be relatively large. For economic and space reasons, the bearing having disc-shaped laminations is conventionally designed to accommodate a greater proportion of the torsional motion. As a result, the disc-type or thrust bearing is relatively long or tall. With increasing length or height, however, the bearing becomes increasingly unstable in a lateral or radial direction.

The lateral instability associated with a tall or long laminated bearing has been recognized and various proposals have been made to counter the instability. One such proposal is to modify the disc-like configuration of the laminations in the bearing so as to resist the lateral movements of individual laminations which result in buckling of the bearing. Representative configurations providing lateral stability are described and illustrated in Hinks et al. U.S. Pat. No. 3,083,065 and Peterson U.S. Pat. No. 3,292,711. Bearings having laminations configured to resemble the laminations of the bearing shown in FIGS. 2 and 6 of the Peterson U.S. Pat. No. 3,292,711 have been utilized successfully in helicopter rotor blade retention systems. Nonetheless, as technology in the construction of helicopters has advanced, increased demands, in terms of higher centrifugal loads and prolonged service life, have been made on laminated bearings utilized in helicopters. Laminated bearings having laminations shaped generally as shown in the Peterson U.S. Pat. No. 3,292,711 and more specifically as shown in FIGS. 2 and 3 of Johnson U.S. Pat. No. 3,807,896 and in FIGS. 1(b) and 3 of an article entitled "Elastomeric Bearing Application to Helicopter Tail Rotor Designs", authored by C. H. Fagan and appearing in the *Journal of the American Helicopter Society*, Volume 13, No. 4(October 1968), have been unable to satisfy increased service life requirements. Such bearings have characteristically failed through failure and extrusion of the elastomeric laminations adjacent to each end of the bearing.

SUMMARY OF THE INVENTION

The present invention is directed to a laminated bearing which may be laterally stabilized, yet overcomes the limitations on service life associated with laterally stabilized bearings utilized in applications such as helicopter rotor blade retention systems. According to the invention, a laminated bearing comprises a plurality of alternating and bonded layers of elastomeric material and nonextensible material. The layers alternate along a common axis extending lengthwise of the bearing so that the bearing can support substantial compressive loads applied generally normal to the layers. Each layer is contoured to have, in section taken radially of the common axis, a portion projecting longitudinally toward one end of the bearing. Such longitudinally projecting portions of the layers are preferably, but not necessarily, incorporated to give lateral stability to the bearing.

It has been found that when large compressive loads are applied to a bearing such as described immediately above, the contour of the layers may contribute to unusually large strains in the elastomeric layers adjacent the end of the bearing toward which the layers project. The excessive strains tend to cause early fatigue failure of the layers and to reduce the service life of the bearing. To accommodate the high stresses occurring in the elastomeric layers without introducing excessive strains, the layers of elastomeric material in a central lengthwise portion of a bearing according to the invention have smaller compression moduli than the layers of elastomeric material adjacent the end of the bearing toward which the layers project. While the compressive stresses on the elastomeric layers are not reduced, the high compression-induced strains are substantially reduced and the life of the bearing is correspondingly increased. In a preferred embodiment, the elastomeric layers along the length of the bearing between the central lengthwise portion of the bearing and the end of the bearing toward which the layers project have progressively increasing compression moduli with increasing distance from the central portion of the bearing.

The larger compression moduli of the layers of elastomeric material adjacent one end of the bearing may increase the torsional spring rate of the bearing to an undesirable level. To reduce the torsional spring rate of the bearing, the layers of elastomeric material adjacent the other end of the bearing may have compression moduli smaller than the moduli of the elastomeric layers in the central lengthwise portion of the bearing. Thus, where desirable and the distribution of compression-induced strains permits, the preferred embodiment of the invention will include elastomeric layers between the central portion and the other end of the bearing which have progressively decreasing compression moduli with increasing distance from the central portion of the bearing.

While varying or grading the compression moduli of the elastomeric layers along the length of a laminated bearing has general applicability to counteract the destructive effects of high compression-induced strains that also vary along the length of a bearing, the inventive gradation of compression moduli has been found to be particularly beneficial in combination with a particular configuration of the laminations in a bearing. The preferred configuration of the layers or laminations is one in which the longitudinally projecting portions of the layers are concavo-convex in radial section. The layers also have, in radial section, edge portions that are planar and normal to the common axis of the layers. Thus, in a typical helicopter rotor bearing that is annular in shape, each layer has annular inner and outer circumferential or peripheral portions that are coplanar and normal to the common axis of the layers in the bearing. An annular concavo-convex intermediate portion of each layer is located between and integral with the inner and outer circumferential portions. Such a configuration of the laminations or layers is known in the art as a configuration to increase the lateral stability of a bearing, as shown by FIG. 5(a) of the previously referenced article by C. H. Fagan appearing in the *Journal of the American Helicopter Society.*

BRIEF DESCRIPTION OF THE DRAWING

For a better understanding of the invention, reference may be made to the following description of an exemplary embodiment, taken in conjunction with the figures of the accompanying drawing, in which:

FIG. 4 is a radial half-section of one of the nonextensible laminations of the bearing of FIG. 3, showing the assumed deformation of the lamination when the bearing of FIG. 3 is subjected to a large compressive load;

DESCRIPTION OF AN EMBODIMENT

Figure 1:
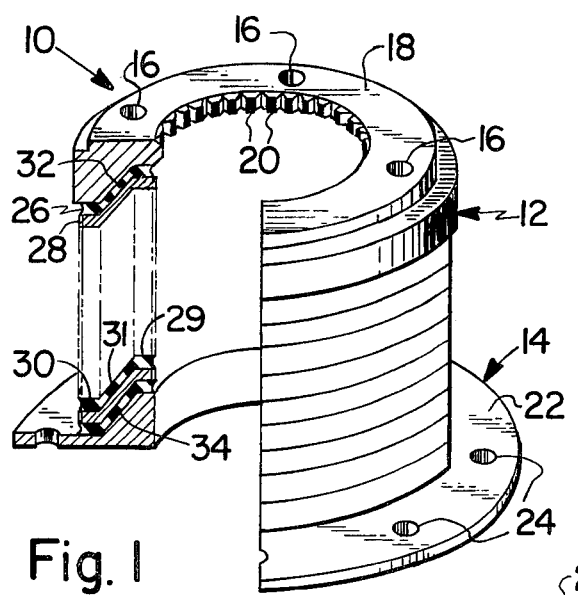
FIG. 1 is a perspective view, partly in section, of a laminated bearing of a type that has been found subject to failure of the elastomeric laminations in high stress, long service life environments.

FIG. 1 of the drawing illustrates a laminated bearing 10 that is suitable and intended for use as a thrust bearing in a retention system for a helicopter rotor blade (not shown). The bearing 10 includes two annular and substantially inflexible end members or end plates 12 and 14 that are axially spaced apart. Circumferentially spaced bolt holes 16 in a flat upper surface 18 of the end plate 12 permit the end plate 12 to be attached to another member, such as the pedestal for a helicopter rotor blade (not shown). Compressive loads are thus applied to the bearing 10 along the flat surface 18. Rotational movements of the rotor blade about its longitudinal axis (i.e. pitch change movements) are transmitted to the bearing 10 through splines 20 formed to extend lengthwise of the bearing on a radially interior circumferential surface of the end plate 12. The splines 20 mesh with corresponding splines on the shaft of the helicopter rotor blade. To permit the opposite or base end of the bearing 10 to be secured to another member, such as a member connecting the bearing 10 to a spherical laminated bearing, the end plate 14 has a radially outwardly extending flange 22 formed with circumferentially spaced bolt holes 24.

Between the end plates 12 and 14 are a plurality of alternating and bonded annular layers or laminations of elastomeric material and nonextensible material. In the bearing of FIG. 1, there are 52 elastomeric layers 26 and 51 layers of nonextensible material 28. The number of layers may be varied to suit the space and/or the functional requirements of a particular installation. The layers 26 and 28 alternate along the longitudinal axis of the bearing 10 so that the compressive load on the surface 18 of the end plate 12 is applied generally normal, rather than parallel, to at least part of the layers. The elastomeric layers 26 are formed of natural rubber, while the layers of nonextensible material 28 are formed of steel. Other elastomeric and nonextensible materials may be substituted for the rubber and steel where appropriate. Alternate elastomeric materials may include synthetic rubber, while alternate nonextensible materials may include other metals, sheets of fiberglass, and sheets of reinforced plastic.

Each of the layers or laminations 26 and 28 has an annular, radially inner circumferential or peripheral portion 29 and an annular, radially outer circumferential or peripheral portion 30. Both peripheral portions 29 and 30 are planar and normal to the longitudinal axis of the bearing 10, although they are not coplanar. An annular intermediate portion 31 of each layer or lamination 26 and 28 extends radially from the outer annular portion 30 of the layer to the inner annular portion 29 of the layer at an upward angle toward the end plate 12. The resulting configuration of the layers, particularly of the layers of nonextensible material 28, stabilizes the bearing 10 against lateral buckling, as is taught by Peterson U.S. Pat. No. 3,292,711. To help insure uniform transfer of compressive loads to the laminations 26 and 28, the end plate surfaces 32 and 34 that are adjacent and bonded to the layers are machined to match the configuration of the laminations.

Figure 2:
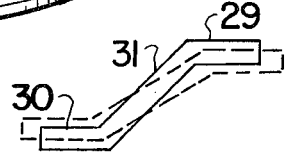
FIG. 2 is a radial half-section of one of the nonextensible laminations of the bearing of FIG. 1, showing the assumed deformation of the lamination when the bearing is subjected to a large compressive load.

Although laminated bearings similar to the bearing 10 of FIG. 1 have been utilized in rotor blade retention systems, the bearings have generally not attained a service life in excess of 1,000 operating hours. Examination of failed bearings similar to bearing 10 has shown that failure is due to extrusion and destruction of the elastomeric laminations 26 adjacent the lower end plate 14 on the radially inner circumference of the bearing and adjacent the upper end plate 12 on the radially outer circumference of the bearing. To explain this unusual failure phenomenon, it was, and is, hypothesized that under compressive loads, the laminations 26 and 28 of the bearing 10 seek to "flatten out", as shown in phantom in FIG. 2 of the drawing. Although the relative deformation of the lamination may be exaggerated in FIG. 2 for purposes of illustration, it is believed that the non-coplanar peripheral portions 29 and 30 of each lamination seek to move into alignment and toward a common plane so that the ultimate shape of each lamination, under maximum load, would be mildly conical. The radially inner circumferential portion 29 of each lamination moves downwardly and the radially outer circumferential portion 30 of each lamination moves upwardly, assuming that the bearing is oriented as shown in FIG. 1. Thus, along the radially inner circumference of the bearing 10, the laminations tend to flex away from the upper end plate 12. For the laminations 26 and 28 adjacent the end plate 12, the large thickness of elastomer between them and the end plate 14, as represented by the layers of elastomeric material throughout the length of the bearing 10, freely accommodates the flexing of the radially inner circumferential portions 29 of the laminations. The compression-induced strains in the elastomeric layers 26 adjacent the end plate 12 are thus relatively low. For the laminations 26 and 28 closer to the opposite end plate 14, on the other hand, the radially inner circumferential portions 29 of the laminations cannot freely flex away from the end plate 12 because of the inflexible mass of the end plate 14. Consequently, the radially inner peripheral portion 29 of the laminations 26 of elastomeric material that are relatively close to the end plate 14 are pinched and highly strained as they bulge from between the intervening peripheral portions 29 of the nonextensible laminations 28. The high strains increase the wear on the elastomeric laminations 26 and cause early fatigue failure of the laminations and extrusion of elastomer from between the metal laminations adjacent the end plate 14.

The phenomenon that is believed to produce high compression-induced strains in the radially inner portions 29 of the elastomeric laminations 26 adjacent the end plate 14 is also believed to produce a similar but opposite result adjacent the radially outer periphery of the bearing 10. Specifically, the radially outer peripheral portions 30 of the lamination 26 and 28 tend to flex or move away from the end plate 14 and toward the end plate 12. The result of the flexing is that the compression-induced strains in the layers of elastomeric material 26 adjacent the end plate 14 are substantially reduced since the layers of nonextensible material 28 are relatively free to move toward the end plate 12. With increasing proximity to the end plate 12, however, there is less elastomer between nonextensible lamination 28 and the substantially inflexible end plate 12 to accommodate flexing of the lamination 28. As a result, the radially outer peripheral portions 30 of the elastomeric laminations 26 adjacent the end plate 12 are highly strained, thereby producing the second area of early failure of the elastomeric laminations which has appeared in tested versions of the bearing 10.

Figure 5:
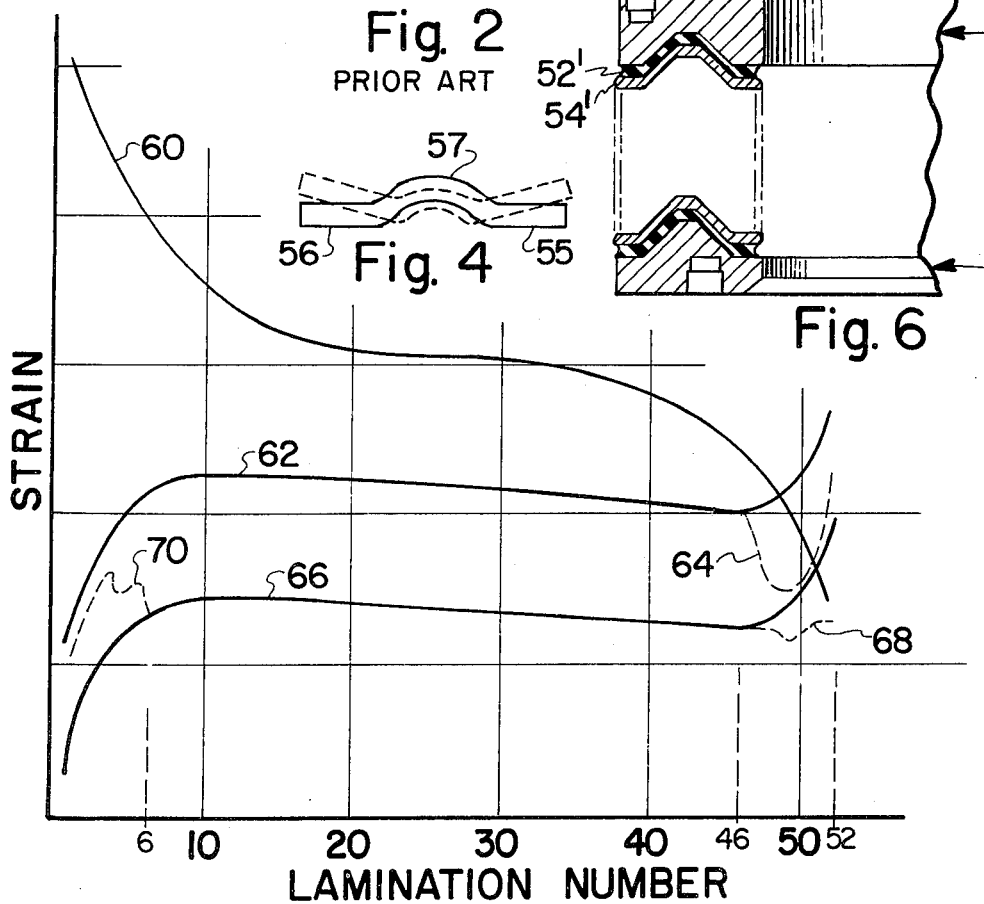
FIG. 5 is a graphical representation of the compression-induced strains experienced by the elastomeric layers in the bearings of FIG. 1 and 3.

The foregoing hypothesis appears to have confirmed by computer finite element analyses of the strains in the elastomeric laminations 26. Information obtained from such a computer analysis is presented graphically in FIG. 5 of the drawing. Relative compression-induced edge shear strain (i.e. the radial strain associated with bulging) is plotted along the vertical axis of the graph in FIG. 5. The locations of the laminations 26, as represented by numbers from 1 to 52, are plotted along the horizontal axis. The lower lamination numbers represent the laminations 26 adjacent the end plate 14 and the higher lamination numbers represent the laminations 26 adjacent the end plate 12. The curve 60 represents the relative strains experienced by the radially inner circumferential portions 29 of the elastomeric laminations 26. While not shown, a curve representing the relative strains experienced by the radially outer peripheral portions of the laminations 26 would resemble curve 60 but be reversed from left to right. In other words, such a curve would rise from a low compression-induced edge shear strain for lamination number 1 to a high compression-induced strain for lamination number 52.

Figure 3:
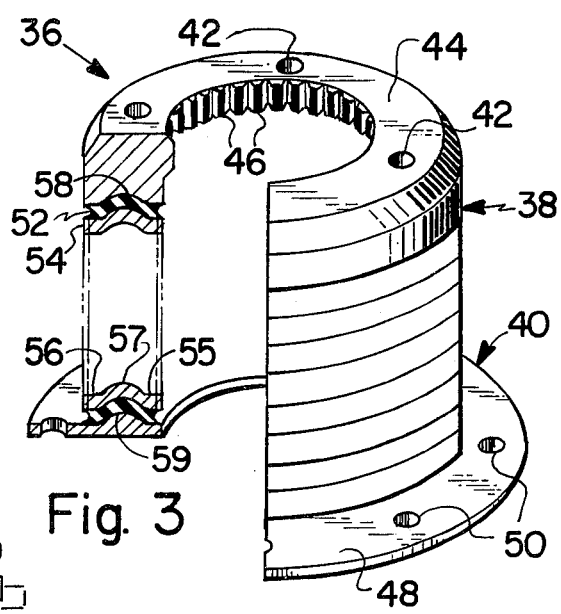
FIG. 3 is a perspective view, partly in section, of a laminated bearing constructed according to the present invention.

A bearing 36, according to the present invention, overcomes the high compression-induced strains and the resulting decrease in service life experienced with the bearing 10 of FIG. 1. As shown in FIG. 3, the bearing 36, like the bearing 10, includes two annular and substantially inflexible end plates 38 and 40 that are axially spaced apart. The end plate 38 may be attached to another member, such as the pedestal base of a helicopter rotor blade (not shown), utilizing bolts (not shown) screwed into bolt holes 42 formed in the flat upper surface 44 of the end plate. Compressive loads are thus applied to the surface 44 of the end plate 38. As in the bearing 10 of FIG. 1, rotational movements of the helicopter rotor blade about its longitudinal axis are transmitted to the bearing 36 through splines 46 that extend lengthwise of the bearing 36 and are formed on a radially inner circumferential surface of the end plate 38. The end plate 40 has a radially outwardly extending flange 48. Bolt holes 50 are formed in the flange 48 so that the end plate 40 may be attached to a member (not shown) connecting the bearing 36 to a spherical laminated bearing, for example, in a helicopter rotor blade retention system.

Between the end plates 38 and 40 are a plurality of alternating and bonded annular layers or laminations of elastomeric material and nonextensible material 52 and 54, respectively. The layers alternate along a common axis extending lengthwise of the bearing 36 with adjacent layers 52 and 54 being bonded to each other in aligned overlapping relationship. There are 52 elastomeric layers 52 and 51 nonextensible laminations 54, the numbers being variable according to space and functional requirements. As in the bearing 10 to FIG. 1, the laminations 52 and 54 are preferably formed of natural rubber and steel, although other elastomeric and nonextensible materials may be utilized. The end plates 38 and 40 are bonded to adjacent elastomeric layers 52.

Each lamination 52 and 54 has an annular, radially inner circumferential or peripheral portion 55 and an annular, radially outer circumferential of peripheral portion 56. The portions 55 and 56 are coplanar and normal to the longitudinal axis of the bearing 36. Located between the integral with the inner and outer circumferential or peripheral portions 55 and 56 of each layer 52 and 54 is an annular intermediate portion 57 that projects longitudinally toward the end plate 38. The intermediate portion 57 of each layer 52 and 54 is concavo-convex in section taken radially to the longitudinal axis of the bearing 36. Stated another way, each layer 52 and 54 has, in radial half-section, a flat outer edge 56, a coplanar inner edge 55, and a concavo-convex intermediate portion 57 joining the two edge portions. To insure uniform load transfer, the end plate surfaces 58 and 59 that are adjacent and bonded to the laminations 52 and 54 are machined to match the laminations.

The laminations 52 and 54 of the bearing 36 are configured to provide lateral or radial buckling stability for the bearing and to reduce their tendency to "flatten out" under compressive loads. While not clearly shown in FIG. 3, the intermediate portion 57 of each nonextensible lamination 52, and the surface 59 of the end plate 40, projects into the concavity of the succeeding lamination 52 or of the surface 58 of the end plate 38. The "symmetry" of the laminations 52 and 54, when viewed in radial half-section, is believed to provide the same lateral stability as laminations 26 and 28 of bearing 10, but with a smaller height or axial projection of the laminations 52 and 54. With a smaller "height", there is believed to be less tendency for the laminations 52 and 54 to "flatten out" under compressive loads.

A computer finite element analysis was made of a laminated bearing 36 constructed according to FIG. 3. A single grade or stock of elastomer was used for every elastomer layer 52 in the bearing and each elastomeric layer had the same thickness. The theoretical compression-induced edge shear strains experienced by the radially inner circumferential portions 55 of the elastomeric layers 52 were found to be generally the same over a substantial central portion of the length of the bearing 36. Adjacent the end plate 38, however, the compression-induced strains in the layers of elastomer 52 increased substantially, while adjacent the end plate 40, the compression-induced strains in the layers of elastomer decreased substantially. The relative theoretical compression-induced strain in each layer of elastomer 52 is represented graphically by the curve 62 in FIG. 5. An analysis of the compression-induced strains in the radially outer circumferential portions 56 of the layers of elastomeric material 52 revealed an essentially identical distribution of strains. In other words, adjacent the end plate 38, the radially outer edges 56 of the elastomeric layers 52 experienced relatively high compression-induced strains, while adjacent the end plate 40, the layers off elastomeric material experienced lesser compression-induced strains, as compared to the strains in the layers of the central lengthwise portion of the bearing 36.

The variations in the compression-induced strains adjacent the end plates 38 and 40 in the bearing 36 of FIG. 3 is believed to be the result of a deformation of the layers 54 of nonextensible material in the bearing 36, as illustrated in phantom in FIG. 4 of the drawing. Specifically, under high compression loads, the nonextensible laminations 54 seek to flatten out. The intermediate, concavo-convex portion 57 of each lamination 54 tends to move into the plane of the peripheral portions 55 and 56 of the lamination. At the same time, the peripheral portions 55 and 56 of each lamination 54 seek to move upwardly toward the concavo-convex portion 57 of the lamination. Adjacent the end plate 38, the intermedite concavo-convex portions 57 of the nonextensible laminations 54 can flex away from the substantially inflexible end plate due to the large thickness of elastomer between the nonextensible laminations and the end plate 40, as represented by the many layers of elastomer throughout the length of the bearing 36. The flat or peripheral portions 55 and 56 of the laminations 54 that are adjacent the end plate 38, on the other hand, cannot freely move toward the end plate 38. Consequently, the peripheral portions 55 and 56 of the layers 52 of elastomeric material adjacent the end plate 38 are pinched and highly strained as they bulge from between adjacent peripheral portions 55 and 56 of the nonextensible laminations 54.

At the end of the bearing 36 adjacent the end plate 40, the planar peripheral portions 55 and 56 of each layer or lamination 54 are free to flex toward the end plate 38. Although the intermediate concavo-convex portions 57 of the nonextensible laminations 54 seek to move toward the end plate 38, the concavo-convex portions 57 of the layers of elastomeric material 52 are essentially confined by the peripheral portions 55 and 56 of the layers 52. As a result, the intermediate portions 57 of the elastomeric laminations 52 cannot bulge in response to the compressive loads on the laminations. The high stresses on the intermediate portions 57 of the elastomeric layers 52 adjacent the end plate 40 are thus resisted essentially through bulk compression of the elastomer without the wear that accompanies the bulging and resultant pinching experienced by the peripheral portions 55 and 56 of the layers 52 adjacent the end plate 38.

Although the configuration of the laminations 52 and 54 reduces the level of the compression-induced strains in the laminations 52, the relatively higher strains in the elastomeric laminations 52 adjacent the end plate 38 represent a potential for early fatigue failure of the bearing 36. To reduce the difference in the compression-induced strains experienced by the various elastomeric layers 52 along the length of the bearing, the six elastomeric layers 52 closest to the end plate 38 (i.e. layers number 47 to 52) in one embodiment of the bearing 36 were specified to be of an elastomer that is stiffer and has a higher elastic modulus (i.e. Young's modulus) than the elastomer in the laminations of the central lengthwise portion of the bearing. The higher elastic modulus of the elasomer higher compression moduli and higher compression stiffnesses for the individual layers 52. The resulting decrease in compression-induced strains experienced by the layers 52 is indicated by the dashed line 64 in FIG. 5. The reduction in the compression-induced strains, while beneficial, produced an unnecessary or over-reduction of the strains in laminations number 48 to 51. The use of a stiffer elastomer in laminations number 47 to 52 also increased the torsional spring rate of the overall bearing 36 to an undesirably high level.

In a second embodiment utilizing the bearing construction illustrated in FIG. 3 of the drawing, all of the layers of elastomer 52 in the bearing 36 were of an elastomer somewhat stiffer than the elastomer used in the first embodiment. The theoretical compression-induced strains in the elastomeric layers 52 of the bearing 36 incorporating the stiffer elastomer are illustrated by the curve 66 in FIG. 5. To reduce the compression-induced strains in the layers 52 adjacent the end plate 38, the six elastomeric laminations 52 (i.e. laminations number 47 to 52) adjacennt the end plate 38 were again specified to be of elastomer that is stiffer or has a higher elastic modulus than the elastomer utilized in the central lengthwise portion of the bearing. Instead of providing each of laminations number 47 to 52 with the same elastomer, however, laminations number 47, 48 and 49 were formed of one elastomer, while laminations number 50, 51 and 52 were fabricated of a second elastomer that is stiffer than both the elastomer used for laminations number 47, 48 and 49 and the elastomer utilized in the central lengthwise portion of the bearing 36. The results of a computer finite element analysis of the strains in the modified elastomeric layers 52 of the bearing are represented by the dashed line 68 extending from the solid line 66 in FIG. 5. The strains in laminations number 47 to 52 were reduced as in the previously described embodiment of bearing 36, but the reduction resulted in a more nearly equal strain in each of the layers.

The use of elastomer that is relatively stiff in the elastomeric laminations 52 adjacent the end plate 38 increases the torsional spring rate of the bearing 36. Depending upon the application intended for the bearing 36, an increase in the torsional spring rate or stiffness of the bearing may or may not be acceptable. In situations where an increased torsional spring rate is not acceptable, the increased spring rate may be readjusted downward by taking advantage of the relatively low compression-induced strains in the elastomeric laminations 52 adjacent the end plate 40. By fabricating these laminations 52 from an elastomer that has a relatively low elastic modulus, each layer will have both a relatively low compression stiffness and a relatively low torsional stiffness. The softer elastomer will cause the laminations 52 to deflect to a greater extend under compressive loads and thus experience a greater compression-induced strain. Larger compression-induced strains are acceptable, however, because of the relatively higher strains experienced by the elastomeric laminations in the central lengthwise portion (i.e. laminations number 7 to 46) of the bearing 36. At the same time, the increased torsional "softness" or reduced torsional stiffness of the laminations 52 adjacent the end plate 40 will offset the increased torsional stiffness of the laminations 52 adjacent the end plate 38.

In the bearing 36 incorporating one elastomeric stock in the central lengthwise portion of the bearing and two stiffer stocks adjacent the end plate 38, softer elastomers were incorporated in the six elastomeric layers adjacent the end plate 40. Elastomeric laminations number 1, 2 and 3 were fabricated of an elastomer softer than the elastomer used anywhere else in the bearing. Elastomeric laminations number 4, 5 and 6 were formed of an elastomer having a modulus of elasticity greater than the modulus of elasticity of the elastomer in laminations number 1, 2 and 3 but less than the moduli of elasticity of the elastomers in layers number 7 to 52. The results of a computer analysis of the changes in compression-induced strains are illustrated by the dashed line 70 in FIG. 5 extending from the solid line 66. The use of progressively stiffer elastomers in the layers of elastomeric material 52 adjacent the upper end plate 38 (to produce higher compression moduli for the layers) in combination with the use of progressively softer elastomers in the layers of elastomeric material 52 adjacent the end plate 40 (to produce lower compression moduli for the layers) permitted a substantial equalization of the compression-induced strains throughout the elastomeric bearing 36 without substantially affecting the torsional spring rate of the bearing.

Figure 6:
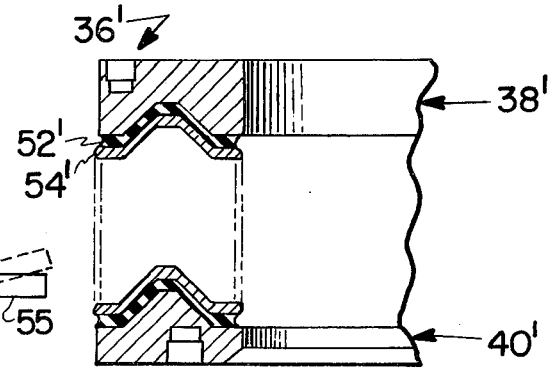
FIG. 6 is a partial sectional view of a modified embodiment of the bearing of FIG. 3.

While the grading of the stiffnesses of the elastomeric layers in a laminated bearing may be utilized to adjust the compression-induced strains in any bearing that has layers contoured to project toward one end of the bearing, grading is particularly advantageous for bearings that incorporate laminations having a symmetrical configuration in radial section, similar to laminations 52 and 54 of the bearing 36 of FIG. 3. FIG. 6 of the drawing illustrates a bearing 36' similar to bearing 36, in which the laminations 52' and 54' have a more sharply angled shape than the laminations 52 and 54 of the bearing 36. While it is considered more difficult to manufacture the bearing 36' than the bearing 36, the elastomer utilized in the elastomeric laminations 52' of the bearing 36' could be graded to minimize the variations in compression strains experienced by the laminations 52'. Another bearing in which it is believed that the elastic and compression moduli of the elastomeric layers could be varied to minimize variations in compressive strains is the bearing illustrated in FIG. 10 of Hinks et al. U.S. Pat. No. 3.083,065, in which the laminations have, in radial half-section, an inverted V-shape. Any of the foregoing bearings can be inverted in use, if desired, since it is the direction in which the layers project, not the direction in which compressive loads are applied, that determines the direction in which the compression moduli of successive elastomeric layers are graded.

With the symmetry, in radial half-section, of the laminations in the preferred embodiment of the present invention, the compression-induced strains experienced by the radially inner and outer circumferential portions of the elastomeric laminations 52 vary in unison from a low in the laminations 52 adjacent the end plate 40 to a high in the laminations 52 adjacent the end plate 38. Thus, a gradation of elastomer stocks which is suitable for the inner circumferential portions 55 of the laminations 52 is also a suitable gradation of stocks for the outer circumferential portions 56 of the layers. In contrast, in the bearing 10 of FIG. 1, the compression-induced strains in the radially inner circumferential portions 29 of the elastomeric laminations 26 vary in exactly the opposite direction as the compression-induced strains in the radially outer circumferential portions 30 of the elastomeric layers. Thus, if each elastomeric lamination 26 in the bearing 10 of FIG. 1 is to be made of single elastomer stock, the layers 26 adjacent both end plates 12 and 14 must be fabricated of relatively stiff elastomer stocks. Such a design, while having a favorable effect on the high compression-induced strains in the elastomeric layers 26, will also significantly increase the torsional spring rate of the bearing 10, which may or may not be desirable. It would also be conceivable to grade or vary the elastomer stiffness within each layer (i.e. radially), in conjunction with grading the stiffness of successive layers.

Although the foregoing discussion has involved laminated bearings that are annular in shape, the gradation of elastomer stocks along the length of a bearing may be equally well applied to a cylindrical bearing such as the one illustrated in FIG. 7 of the Hinks et al U.S. Pat. No. 3,083,065. Similarly, while the foregoing discussion has involved increasing the compression moduli of elastomeric laminations through the use of stiffer stocks of elastomer (i.e. elastomers having higher moduli of elasticity), the same result could be attained by varying the thicknesses of the layers of the layers of elastomer. Thus, where the foregoing discussion has specified a softer elastomer, one might merely increase the thickness of the layer of elastomer without changing the elastomer to an elastomer having a lower modulus of elasticity or Young's modulus. The relationship between compression modulus and lamination thickness or shape factor is well-known in the art, as shown by the technical bulletin entitled "Engineering Design with Natural Rubber" prepared by the Natural Rubber Producers' Research Association. In any given design, however, it is considered more effective and easier to manufacture a graded-compression-modulus bearing that incorporates different elastomers of varying moduli of elasticity, rather than a bearing that incorporates elastomeric laminations of different thicknesses. Varying the thicknesses and the moduli of elasticity of successive layers of elastomer with increasing radial distance from the center of a spherical or cylindrical bearing is known in the art, as shown by Schmidt U.S. Pat. No. 3,679,197.

It will be understood that the embodiment described above is merely exemplary and that persons skilled in the art may make many variations and modifications without departing from the spirit and scope of the invention. For example, while reference has been made to bearings having laminations configured to prevent movement of the individual laminations transversely of the longitudinal axis of the bearing, the present invention may have equal applicability to compressive load carrying bearings having spherically configured shims, such as the bearing 28 illustrated in FIG. 3 of Rybicki et al U.S. Pat. No. 3,829,239. All such modifications and variations are intended to be within the scope of the invention as defined in the appended claims.

What is claimed is:

1. A laminated bearing comprising a plurality of alternating and bonded layers of elastomeric material and nonextensible material, said layers alternating along a common axis extending lengthwise of the bearing so as to permit the bearing to support compressive loads applied generally normal to the layers and to accommodate torsional loads applied about said common axis, each layer being contoured to have in section taken radially of said common axis a portion projecting longitudinally toward one end of the bearing, the layers of elastomeric material adjacent said one end of the bearing having larger compression moduli than layers of elastomeric material located more centrally along the length of the bearing.

2. A laminated bearing, according to claim 1, wherein the elastomeric layers along the length of the bearing between a central lengthwise portion of the bearing and said one end of the bearing have progressively increasing compression moduli with increasing distance from said central portion of the bearing.

3. A laminated bearing, according to claim 1, wherein the layers of elastomeric material in a central lengthwise portion of the bearing have greater compression moduli than the layers of elastomeric material adjacent the other end of the bearing.

4. A laminated bearing, according to claim 3, wherein the elastomeric layers along the length of the bearing between said central portion and the other end of the bearing have progressively decreasing compression moduli with increasing distance from said central portion of the bearing.

5. A laminated bearing, according to claim 1, wherein the longitudinally projecting portions of the layers are concavo-convex in radial section.

6. A laminated bearing according to claim 5, wherein the layers also have in radial section edge portions that are planar and normal to said common axis.

7. A laminated bearing, according to claim 1, wherein the layers of elastomeric material in a central lengthwise portion of the bearing have equal compression moduli.

8. A laminated bearing, according to claim 1, also comprising a substantially inflexible end member at each end of the bearing, each end member having a surface contoured to match said layers and bonded to an adjacent layer.

9. A laminated bearing comprising a plurality of annular alternating layers of elastomeric material and nonextensible material, said layers alternating along a common axis extending lengthwise of the bearing with adjacent layers being bonded to each other in aligned overlapping relationship so as to permit the bearing to support compressive loads applied generally normal to the layers and to accommodate torsional loads applied about said common axis, each layer being contoured to have in half-section taken radially of said common axis a portion projecting longitudinally toward one end of the bearing, the layers of elastomeric material in a central lengthwise portion of the bearing having smaller compression moduli than the layers of elastomeric material adjacent said one end of the bearing.

10. A laminated bearing, according to claim 9, wherein each layer also has in radial half-section radially inner and outer peripheral portions that are coplanar and normal to said common axis, the longitudinally projecting portion of each layer being disposed intermediate said peripheral portions and being concavo-convex in radial section.

11. A laminated bearing, according to claim 9, wherein the elastomeric layers along the length of the bearing between said central portion and said one end of the bearing have progressively increasing compression moduli with increasing distance from said central portion of the bearing.

12. A laminated bearing, according to claim 9, wherein the layers of elastomeric material in the central lengthwise portion of the bearing have greater compression moduli than the layers of elastomeric material adjacent the other end of the bearing.

13. A laminated bearing, according to claim 12, wherein the elastomeric layers along the length of the bearing between said central portion and the other end of the bearing have progressively decreasing compression moduli with increasing distance from said central portion of the bearing.

14. A laminated bearing, according to claim 9, also comprising a substantially inflexible annular end member at each end of the bearing, each end member having a surface contoured to match said layer and bonded to an adjacent layer.

15. A laminated bearing comprising
    a. a plurality of annular alternating layers of elastomeric material and nonextensible material, said layers alternating along a common axis extending lengthwise of the bearing with adjacent layers being bonded to each other in aligned overlapping relationship so as to permit the bearing to support compressive loads applied generally normal to the layers and to accommodate torsional loads applied about said common axis, each layer having annular inner and outer circumferential portions that are coplanar and normal to said common axis and an annular intermediate portion located between and integral with said inner and outer circumferential portions, said intermediate portion projecting longitudinally toward one end of the bearing, the layers of elastomeric material in a central lengthwise portion of the bearing having smaller compression moduli than the layers of elastomeric mterial adjacent said one end of the bearing and having larger compression moduli than the layers of elastomeric material adjacent the other end of the bearing, said elastomeric layers adjacent one end of the bearing having progressively increasing compression moduli with increasing distance from said central portion of the bearing and said elastomeric layers adjacent the other end of the bearing having progressively decreasing compression moduli with increasing distance from said central portion of the bearing, and
    b. an annular substantially inflexible end member at each end of the bearing, each end member having a surface contoured to match said layers and bonded to an adjacent layer.

16. A laminated bearing comprising a plurality of alternating and bonded layers of elastomeric material and nonextensible material, said layers alternating along a common axis extending lengthwise of the bearing so as to permit the bearing to support compressive loads applied generally normal to the layers and to accommodate torsional loads applied about said common axis, each layer being contoured to have in section taken radially of said common axis a portion projecting longitudinally toward one end of the bearing, the layers of elastomeric material adjacent the other end of the bearing having smaller compression moduli than layers of elastomeric material located more centrally along the length of the bearing.

* * * * *